United States Patent
Heo et al.

(10) Patent No.: US 10,777,837 B2
(45) Date of Patent: Sep. 15, 2020

(54) FUEL CELL STACK

(71) Applicants: Hyundai Motor Company, Seoul (KR); Kia Motors Corporation, Seoul (KR)

(72) Inventors: Seong Il Heo, Yongin-Si (KR); Yoo Chang Yang, Gunpo-si (KR); Byeong-Heon Jeong, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 83 days.

(21) Appl. No.: 16/197,587

(22) Filed: Nov. 21, 2018

(65) Prior Publication Data

US 2020/0119385 A1 Apr. 16, 2020

(30) Foreign Application Priority Data

Oct. 10, 2018 (KR) .................. 10-2018-0120682

(51) Int. Cl.
*H01M 8/2465* (2016.01)
*H01M 8/0202* (2016.01)
*H01M 8/0297* (2016.01)
*H01M 8/1004* (2016.01)

(52) U.S. Cl.
CPC ....... *H01M 8/2465* (2013.01); *H01M 8/0202* (2013.01); *H01M 8/0297* (2013.01); *H01M 8/1004* (2013.01)

(58) Field of Classification Search
None
See application file for complete search history.

(56) References Cited

U.S. PATENT DOCUMENTS

| | | | | |
|---|---|---|---|---|
| 2007/0231661 A1* | 10/2007 | Hayashi | ............. | H01M 8/0247 429/510 |
| 2008/0044712 A1* | 2/2008 | Ko | ...................... | H01M 8/0297 429/442 |
| 2012/0258379 A1* | 10/2012 | Fukuta | ............... | H01M 8/0206 429/457 |
| 2016/0248106 A1 | 8/2016 | Kurihara et al. | | |

FOREIGN PATENT DOCUMENTS

| | | | |
|---|---|---|---|
| JP | 2008-112721 A | | 5/2008 |
| JP | 2008112721 A | * | 5/2008 |
| JP | 2014-120213 A | | 6/2014 |
| JP | 2016-170961 A | | 9/2016 |
| KR | 10-0783423 B1 | | 12/2007 |
| KR | 10-0851596 B1 | | 8/2008 |

OTHER PUBLICATIONS

European Search Report dated May 27, 2019 for European Patent Application No. 18208255.2.

* cited by examiner

*Primary Examiner* — Daniel S Gatewood
(74) *Attorney, Agent, or Firm* — Morgan, Lewis & Bockius LLP (57) ABSTRACT

A fuel cell stack may include stacking multiple cell units, each of which has a metal first separator plate and a second separator plate positioned opposite to the first separator plate with a membrane electrode assembly interposed therebetween, wherein the first and second separator plates of adjacent cell units are disposed to face each other and bonded to each other by an adhesive, the adhesive having an adhesive property varying according to a temperature change.

14 Claims, 7 Drawing Sheets

FUEL CELL STACK

CROSS REFERENCE TO RELATED APPLICATION

The present application claims priority to Korean Patent Application No. 10-2018-0120682, filed Oct. 10, 2018, the entire contents of which is incorporated herein for all purposes by this reference.

BACKGROUND OF THE INVENTION

Field of the Invention

The present invention relates generally to a fuel cell stack and, more particularly, to a fuel cell stack capable of improving structural stability and airtightness under a thermal shock environment through improvement in a method of bonding adjacent separator plates to each other.

Description of Related Art

As well known in the art, a fuel cell is a kind of power generator that converts chemical energy of fuel into electrical energy through an electrochemical reaction in a stack. Fuel cells have a wide range of applications, including provided as industrial power generators, provided as household power generators, powering vehicles, and powering small electronic devices such as portable devices. In recent years, fuel cells have increasingly been used as clean energy sources of high efficiency.

A typical cell unit of a fuel cell has a membrane electrode assembly (MEA) located at the innermost side thereof. The MEA may include a polymer electrolyte membrane (PEM) allowing transport of protons therethrough, catalyst layers (CLs), that is, a cathode and an anode, applied on opposite surfaces of the PEM and in which an electrochemical reaction between hydrogen and oxygen takes place.

Furthermore, the MEA has a pair of separator plates positioned on opposite surfaces thereof, that is, on external surfaces of the cathode and the anode to supply a reaction gas and discharge water generated by the electrochemical reaction. Herein, gas diffusion layers (GDLs) may be located between the MEA and the separator plates to diffuse or promote flow of the reaction gas and generated water. Herein, the pair of separator plates may be divided into an anode separator plate positioned on the anode, and a cathode separator plate positioned on the cathode.

Meanwhile, a fuel cell stack may include a series arrangement of stacked multiple cell units. Herein, the cell units are stacked on top of each other such that an anode separator plate of one of the cell units and a cathode separator plate of an adjacent one are disposed to face each other.

Accordingly, to efficiently perform a stacking process of the cell units and to maintain the degree of alignment of the respective cell units, stacking of the cell units is performed by employing an integrated structure of the anode separator plate and the cathode separator plate of the adjacent cell units, which are disposed to face each other.

Figure 1:
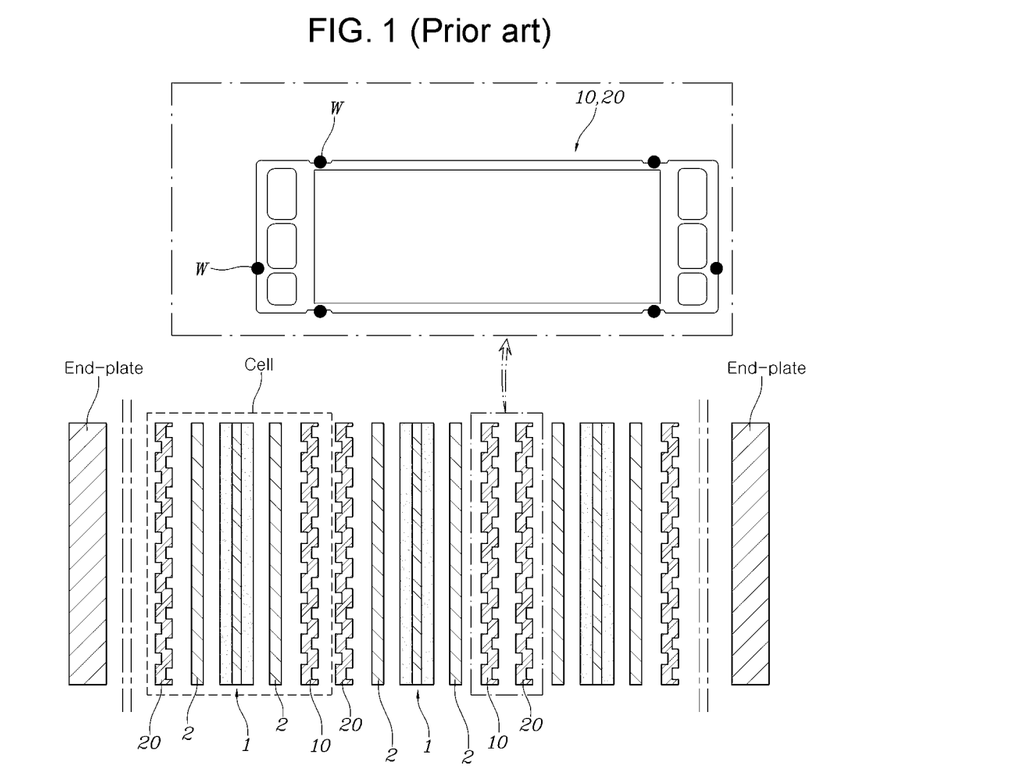
FIG. 1 is a view showing separator plates integrated by welding according to the related art.

FIG. 1 is a view showing separator plates integrated by welding according to the related art including membrane electrode assembly (MEA) 1 and a gas diffusion layer (GDL) 2. As shown in FIG. 1, a typical method of integrating an anode separator plate 10 and a cathode separator plate 20 of adjacent cell units adopted a method of spot welding W predetermined points on the edge portions of the anode and cathode separator plates 20 which are in contact with each other.

Meanwhile, separator plates are generally made of 300 series stainless steel. However, in recent years, to suppress corrosion of the separator plates due to the generated water generated during operation of the fuel cell stack, the cathode separator plate 20, which is relatively highly exposed to the generated water, may include a metal material having excellent corrosion resistance, for example, 400 series stainless steel.

When the anode separator plate 10 and the cathode separation plate 20 are made of different metal materials and then welded together as described above, a corrosion resistance performance is improved during operation of the fuel cell stack. However, there is a problem in that the anode separator plate 10 and the cathode separator plate 20, which are in contact with each other, may undergo undesirable bending deformation due to the temperature changed during operation of the fuel cell stack.

Figure 2A:
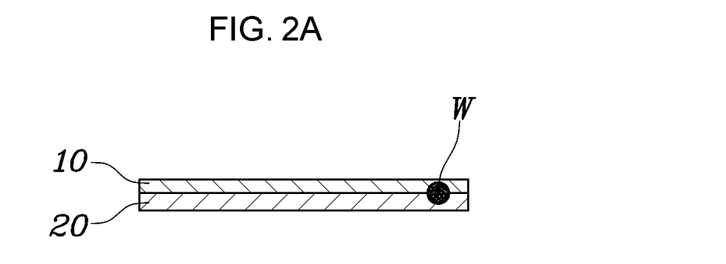
FIG. 2A, FIG. 2B and FIG. 2C are views showing a behavior of the separator plates integrated by welding, which is generated during operation of a fuel cell stack.
Figure 2B:
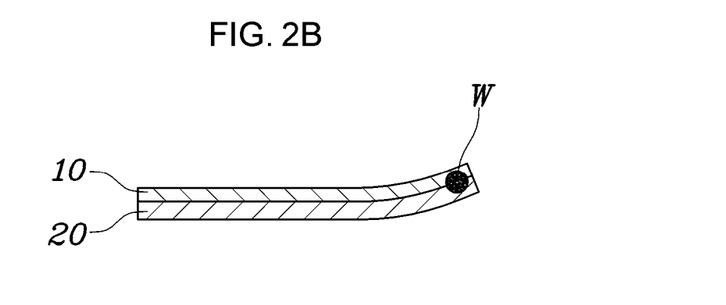
Figure 2C:
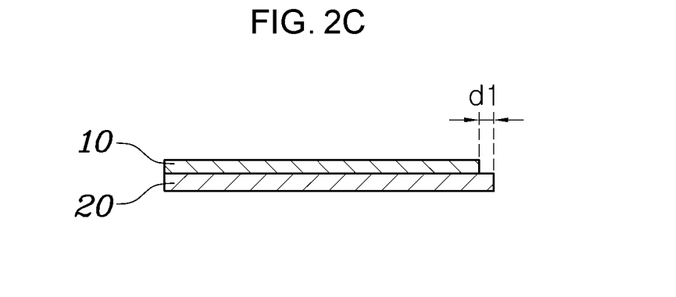

FIG. 2A, FIG. 2B and FIG. 2C are views showing a behavior of the separator plates integrated by welding, which is generated during operation of the fuel cell stack. As shown in FIG. 2A, the anode separator plate 10 and the cathode separator plate 20 are integrated by welding W the predetermined points on the edge portions thereof for stacking of the cell units.

The fuel cell stack, which may include stacking the multiple cell units each including the anode separator plate 10 and the cathode separator plate 20 in such a manner, has a high-temperature ambient environment during operation and has a room-temperature ambient environment upon operation termination while having a low-temperature ambient environment during winter operation.

Under an environment where the ambient temperature of the fuel cell stack is lowered depending on whether the fuel cell stack is operated and depending on a change in ambient environment, as shown in FIG. 2B, a phenomenon where the anode and cathode separator plates 10 and 20 undergo undesirable bending deformation in a state where the predetermined points are secured by welding W occurs due to a difference in thermal expansion coefficient of the metal materials forming the separator plates in a direction of the anode separator plate 10 having a relatively high thermal expansion coefficient.

Furthermore, as shown in FIG. 2C, the anode separator plate 10 and the cathode separator plate 20 in the related art, which are continuously exposed to such an environment in which the ambient temperature is changed, may undergo expansion and contraction in a state where the predetermined points are secured by welding W, leading to a difference d1 in length change. Additionally, deformation may occur at welded portions, leading to degradation in structural stability of the fuel cell stack and thus leading to leakage of the reaction gas.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a fuel cell stack configured for maintaining structural stability and airtightness under a repeated thermal shock environment through improvement in a method of bonding separator plates to each other, which are made of different materials and disposed to face each other.

According to various aspects of the present invention, there is provided a fuel cell stack having stacking multiple cell units and including: the multiple cell units each including a metal first separator plate and a metal second separator plate positioned opposite to the first separator plate with a membrane electrode assembly interposed therebetween, wherein the first and second separator plates of adjacent cell units are disposed to face each other and are bonded to each other by an adhesive, the adhesive having an adhesive property varying according to a temperature change such that an adhesive force of the adhesive is maintained at a temperature lower than an operating temperature of the fuel cell stack and is released at the operating temperature of the fuel cell stack.

The first separator plate and the second separator plate may include metal materials having different thermal expansion coefficients.

The adhesive may be a thermoplastic adhesive.

The adhesive may be a cyanoacrylate-based adhesive.

The adhesive may be applied to an interface between the first and second separator plates at predetermined points on edge portions thereof.

The adhesive may be applied to surround end portions of first and second separator plates at predetermined points on edge portions thereof.

The edge portion of the first separator plate may be divided into a first portion spaced from the second separator plate and a second portion extending and bent from the first portion and being in contact with the second separator plate via the adhesive, wherein the first portion may be formed in a central direction of the first separator plate, and the second portion may be formed in an outward direction of the first separator plate.

The second portion of the first separator plate may be formed to be gradually spaced out from the second separator plate and may be bonded to the second separator plate by the adhesive in a state of being elastically bent and deformed.

The second portion of the first separator plate may have a through hole formed therein such that the adhesive is filled in the through hole.

The first separator plate may include a metal material having a thermal expansion coefficient smaller than a thermal expansion coefficient of the second separator plate.

According to the exemplary embodiment of the present invention, the use of the adhesive having the adhesive property varying according to the temperature change enables the separator plates, which are made of different materials and disposed to face each other, to be bonded to each other for integration. Accordingly, the adhesive force of the adhesive is enabled to be maintained during a stacking process, making it possible to efficiently perform the stacking process. Additionally, the adhesive force of the adhesive is enabled to be released when thermal shock is applied to the stack due to operation of the stack and a change in ambient environment, making it possible to enable the separator plates to expand and contract without interfering with each other. As a result, it is possible to prevent the separator plates from undergoing undesirable deformation, thus maintaining the airtightness of the stack.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, various exemplary embodiments of the present invention will be described in detail with reference to the accompanying drawings. The exemplary embodiments of the present invention are presented to make complete disclosure of the present invention and help those who are ordinarily skilled in the art best understand the present invention. Various changes to the following embodiments are possible and the scope of the present invention is not limited to the following embodiments. Throughout the drawings, the same reference numerals will refer to the same or like parts.

Figure 3:
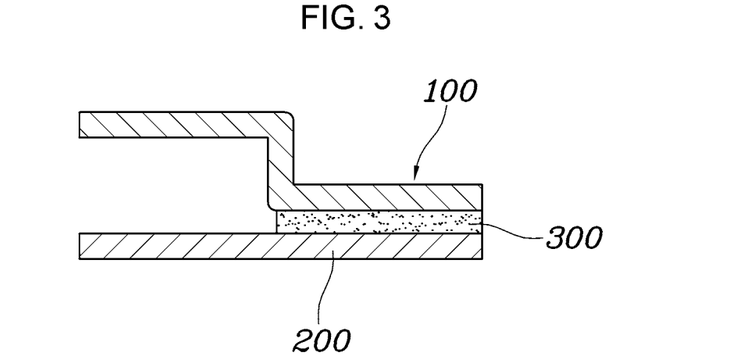
FIG. 3 is a view showing integrated separator plates of a fuel cell stack according to an exemplary embodiment of the present invention.

FIG. 3 is a view showing integrated separator plates of a fuel cell stack according to an exemplary embodiment of the present invention.

The fuel cell stack according to the exemplary embodiment of the present invention is referred to as a fuel cell stack having stacking multiple cell units and maintains a typical cell unit configuration.

For example, a cell unit forming the fuel cell stack according to the exemplary embodiment of the present invention has a membrane electrode assembly (MEA) located at the innermost side thereof, and the MEA has a pair of separator plates positioned on opposite surfaces thereof to supply a reaction gas and discharge generated water generated by the electrochemical reaction. Herein, gas diffusion layers (GDLs) may be located between the MEA and the separator plates to diffuse or promote flow of the reaction gas and generated water. Herein, the pair of separator plates may be divided into an anode separator plate positioned on the anode and a cathode separator plate positioned on the cathode. In the exemplary embodiment of the present invention, the pair of separator plates is divided into a first separator plate and a second separator plate.

Meanwhile, the fuel cell stack includes a series arrangement of stacked multiple cell units. Herein, as shown in FIG. 3, the cell units are stacked on top of each other such that an anode separator plate of one of the cell units and a cathode separator plate of an adjacent one are disposed to face each other. FIG. 3 is a cross-sectional view showing edge portions of the first separator plate 100 and the second separator plate 200.

Accordingly, the separator plates forming the fuel cell stack according to the exemplary embodiment of the present invention are configured such that a first separator plate 100 and a second separator plate 200 of cell units adjacent to each other are positioned to face each other, and the first separator plate 100 and the second separator plate 200 are bonded to each other by an adhesive 300 having an adhesive property varying according to a temperature change. Herein, an adhesion point where the separator plates are bonded to each other by the adhesive 300 is not limited to a specific position but may be various points where the first separator plate 100 and the second separator plate 200 may be bonded. For example, the adhesive 300 may be applied to an interface between the first and second separator plates 100 and 200 at predetermined points on edge portions thereof. Herein, the predetermined points may be positions corresponding to spot welded portions for integrating a pair of adjacent separator plates according to the related art.

Furthermore, the adhesive 300 may be applied to surround end portions of the first separator plate 100 and the second separator plate 200 at the predetermined points on the edge portions thereof.

Meanwhile, in an exemplary embodiment of the present invention, the configuration of the cell unit forming the fuel cell stack maintains the configuration of a conventional typical cell unit, but the pair of separator plates, that is, the first separator plate 100 and the second separator plate 200 forming the cell unit, are made of metal materials having different thermal expansion coefficients. For example, the first separator plate 100 includes 300 series stainless steel and the second separator plate 200 includes 400 series stainless steel.

In an exemplary embodiment of the present invention, the adhesive 300 used to bond the first separator plate 100 and the second separator plate 200 to each other is an adhesive 300 having the properties that an adhesive force is maintained at a temperature lower than an operating temperature of the fuel cell stack and the adhesive force is released at the operating temperature of the fuel cell stack. To realize the present characteristic, the adhesive 300 may be a thermoplastic adhesive. For example, considering that the operating temperature of the fuel cell stack is approximately 60 to 70° C., the adhesive 300 may be a cyanoacrylate-based adhesive having a melting point of approximately 60° C.

The behavior of each separator plate, which is generated during operation of the fuel cell stack, will be described with reference to the drawings, the fuel cell stack being configured with the first separator plate 100 and the second separator plate 200 that are integrally bonded to each other by the adhesive 300 having the adhesive property varying according to the temperature change as described above.

FIG. 4A, FIG. 4B, FIG. 4C and FIG. 4D are views showing the behavior of the integrated separator plates of the fuel cell stack according to the exemplary embodiment of the present invention, which is generated during operation of the fuel cell stack.

In FIG. 4A, FIG. 4B, FIG. 4C and FIG. 4D, the first separator plate 100 is a separator plate including a metal material having a thermal expansion coefficient relatively smaller than that of the second separator plate 200. The second separator plate 200 is a separator plate including a metal material having a thermal expansion coefficient relatively greater than that of the first separator plate 200.

Figure 4A:
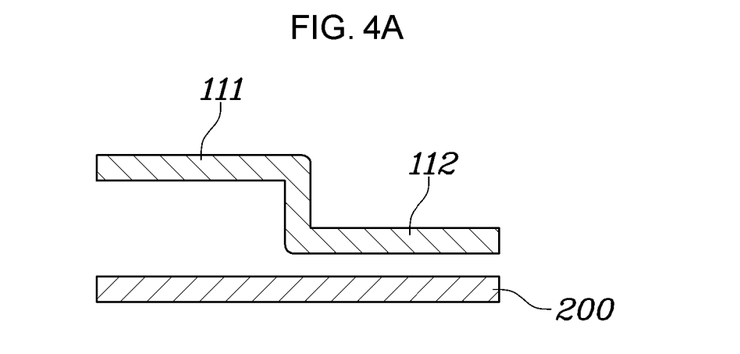
FIG. 4A, FIG. 4B, FIG. 4C and FIG. 4D are views showing a behavior of the integrated separator plates of the fuel cell stack according to the exemplary embodiment of the present invention, which is generated during operation of the fuel cell stack.

Herein, as shown in FIG. 4A, the edge portion of the first separator plate 100 is divided into a first portion 111 spaced from the second separator plate 200 and a second portion 112 extending and bent from the first portion 111 and being in contact with the second separator plate 200 via an adhesive 300a. Thus, the first portion 111 is formed in a central direction of the first separator plate 100, and the second portion 112 is formed in an outward direction of the first separator plate 100.

In an exemplary embodiment of the present invention, the first portion 111 may include a first member 111a aligned in parallel to the second separator plate 200 and a second member 111b aligned perpendicular to the first member 111a to form a right angle or obtuse angle between the first member 111a and the second member 111b. In addition, the second member 111b is aligned perpendicular to the second portion 112 to form a right angle or obtuse angle θ1 between the second member 111b and the second portion 112.

Furthermore, the edge portion of the second separator plate 200, that is, a portion thereof corresponding to where the first portion 111 and the second portion 112 of the first separator plate 100 are formed, is formed in a planar plate shape.

Figure 4B:
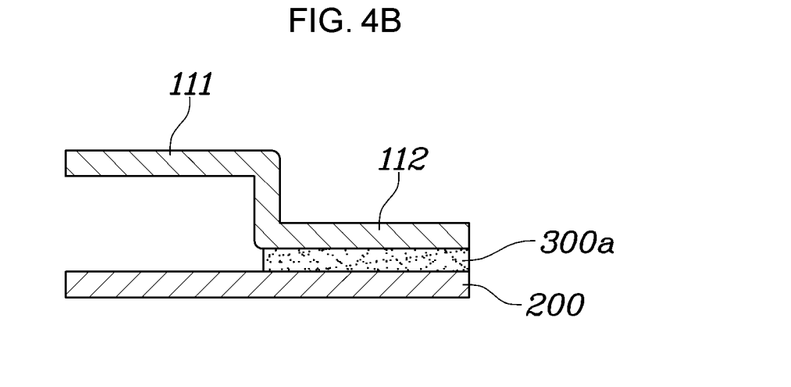

Thus, as shown in FIG. 4B, the second portion 112 of the first separator plate 100 and the second separator plate 200 face each other, and the adhesive 300a is applied to an interface therebetween, causing the first separator plate 100 and the second separator plate 200 to be bonded to each other.

In the case where the fuel cell stack includes stacking the cell units in a state where the first separator plate 100 and the second separator plate 200 are maintained in a shape shown in FIG. 4B, the integration of the first separator plate 100 and the second separator plate 200 by the adhesive is maintained, thus maintaining the degree of alignment of the stack.

Figure 4C:
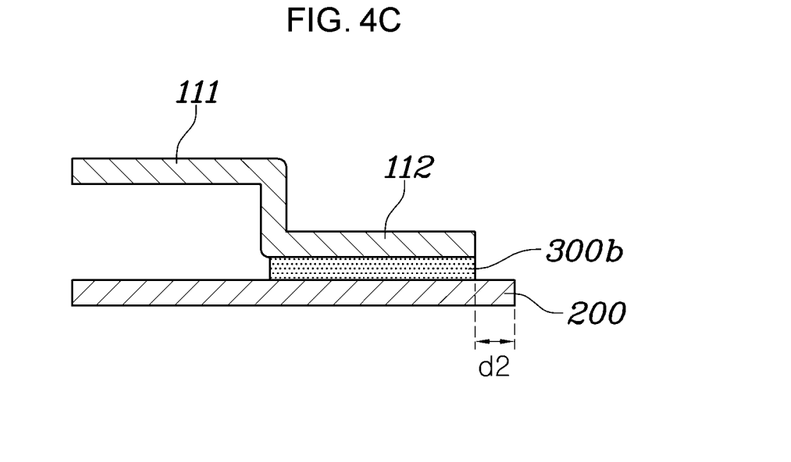

In the instant state, when thermal shock is applied to the fuel cell stack due to operation of the fuel cell stack and a change in ambient environment, for example, when the ambient temperature of the fuel cell stack is changed from room temperature to high temperature due to operation of the fuel cell stack, the second separator plate 200 having a relatively large thermal expansion coefficient expands more than the first separator plate 100, leading to a difference d2 in length change with respect to the first separator plate 100. In the instant case, the adhesive 300a becomes an adhesive 300b which is in a state where the adhesive force is released due to the operating temperature of the fuel cell stack, and thus the first and second separator plates 100 and 200 are separated at the interface therebetween due to the adhesive force of the adhesive 300b being released. This ensures that the first separator plate 100 and the second separator plate 200 do not interfere with each other even upon expansion, making it possible to prevent a phenomenon where the first separator plate 100 and the second separator plate 200 undergo undesirable bending deformation.

Figure 4D:
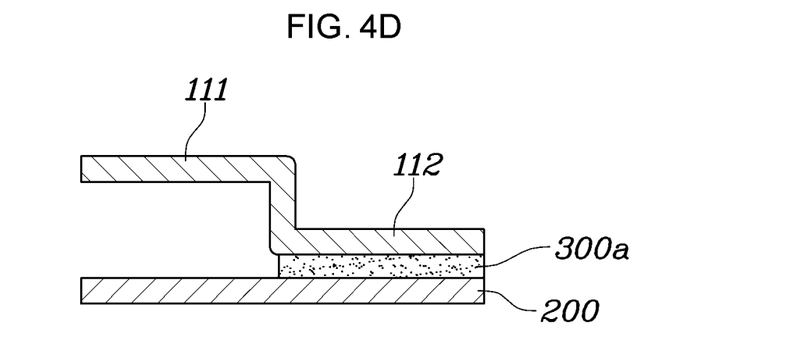

When operation of the fuel cell stack is terminated in the instant state, the ambient temperature of the fuel cell stack is changed from high temperature to room temperature, causing the first separator plate 100 and the second separator plate 200 to contract without interfering with each other as shown in FIG. 4D. Herein, the ambient temperature is lowered below a melting point of the adhesive 300a and thus the adhesive force exerted thereby to be generated again, causing the first and second separator plates 100 and 200 having contracted to be rebonded to each other for integration.

As described above, the adhesive force exerted by the adhesive 300a on the first separator plate 100 and the second separator plate 200 is maintained during stacking of the fuel cell stack, thus maintaining the degree of alignment of the stack. Meanwhile, the adhesive force exerted by the adhesive 300b is released during operation of the fuel cell stack due to the ambient temperature changing from room temperature to high temperature, causing the first separator plate 100 and the second separator plate 200 to be separated from each other. Because of this, even when the first separator plate 100 and the second separator plate 200 expand and contract at different ratios, the separated first and second separator plates 100 and 200 expand and contract without interfering with each other. This makes it possible to prevent the first separator plate 100 and the second separator plate 200 from undergoing undesirable deformation.

On the other hand, the shape of the second portion of the first separator plate and the application position of the adhesive may be varied to maintain the degree of alignment and the structural stability of the separator plates.

FIGS. 5A to 7D are views showing a behavior of integrated separator plates of a fuel cell stack according to various exemplary embodiments of the present invention, which is generated during operation of the fuel cell stack.

In FIGS. 5A, 5B, 5C, and 5D, a first separator plate 100 is a separator plate including a metal material having a thermal expansion coefficient relatively smaller than that of a second separator plate 200, and the second separator plate 200 is a separator plate including a metal material having a thermal expansion coefficient relatively greater than that of the first separator plate 100, which remains the same as the exemplary embodiment described above.

Figure 5A:
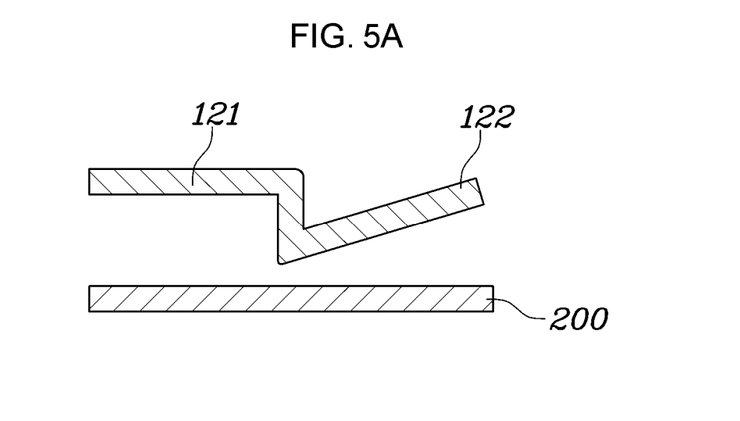
FIG. 5A, FIG. 5B, FIG. 5C, FIG. 5D, FIG. 6A, FIG. 6B, FIG. 6C, FIG. 6D, FIG. 7A, FIG. 7B, FIG. 7C and FIG. 7D are views showing a behavior of integrated separator plates of a fuel cell stack according to various exemplary embodiments of the present invention, which is generated during operation of the fuel cell stack.

Herein, as shown in FIG. 5A, the first separator plate 100 is divided into a first portion 121 spaced from the second separator plate 200 and a second portion 122 extending and bent from the first portion 121 and being in contact with the second separator plate 200 via an adhesive 300a. Herein, the second portion 122 is formed in a shape to be bent and gradually spaced out from the second separator plate 200 rather than a shape to face the second separator plate 200 to be in contact therewith.

In an exemplary embodiment of the present invention, the first portion 121 may include a first member 121a aligned in parallel to the second separator plate 200 and a second member 121b aligned perpendicular to the first member 121a to form a right angle or obtuse angle between the first member 121a and the second member 121b. In addition, the second member 121b is aligned to form an acute angle θ2 between the second member 121b and the second portion 122.

Figure 5B:
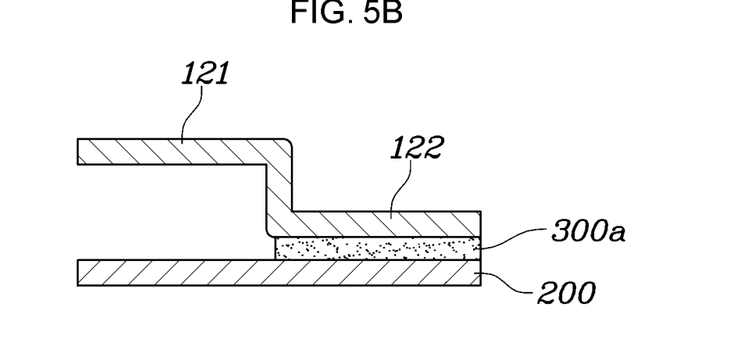

However, as shown in FIG. 5B, when the second portion 122 of the first separator plate 100 and the second separator plate 200 are bonded to each other, the second portion 122 of the first separator plate 100 and the second separator plate 200 surface each other in a state where the second portion 122 of the first separator plate 100 is elastically bent and deformed to face the second separator plate 200 to be in contact therewith. Thereafter, the adhesive 300a is applied to an interface between the first and second separator plates 100 and 200, causing the separator plates to be bonded to each other.

In the case where the fuel cell stack includes stacking the cell units in a state where the first separator plate 100 and the second separator plate 200 are maintained in a shape shown in FIG. 5B, the integration of the first separator plate 100 and the second separator plate 200 by the adhesive is maintained, thus maintaining the degree of alignment of the stack.

Figure 5C:
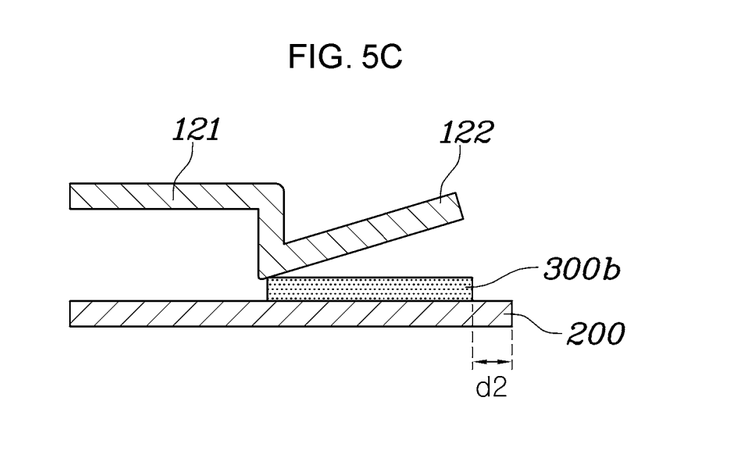

In the instant state, when the ambient temperature of the fuel cell stack is changed from room temperature to high temperature due to operation of the fuel cell stack, as shown in FIG. 5C, the adhesive 300a becomes an adhesive 300b which is in a state where an adhesive force is released due to operation temperature of the fuel cell stack, and thus the first and second separator plates 100 and 200 are separated at an interface therebetween due to the adhesive force of the adhesive 300b being released. This causes the second portion 122 of the first separator plate 100 to be restored to the shape to be bent and gradually spaced out from the second separator plate 200 by an elastic force exerting thereon upon separation. Additionally, because the first and second separator plates 100 and 200 are separated at the interface therebetween due to the adhesive force of the adhesive 300b being released, the first separator plate 100 and the second separator plate 200 do not interfere with each other even upon expansion. This makes it possible to prevent a phenomenon where the first separator plate 100 and the second separator plate 200 undergo undesirable bending deformation.

Figure 5D:
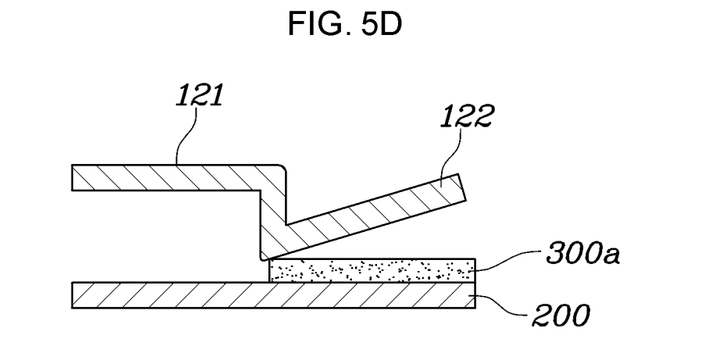

When operation of the fuel cell stack is terminated in the instant state, the ambient temperature of the fuel cell stack is changed from high temperature to room temperature, causing the first separator plate 100 and the second separator plate 200 to contract without interfering with each other as shown in FIG. 5D. Herein, the ambient temperature is lowered below a melting point of the adhesive 300a, causing the adhesive force exerted thereby to be generated again. However, the second portion 122 of the first separator plate 100 having been restored in shape by the adhesive force exerting thereon and the second separator plate 200 are maintained in a state of being spaced from each other, making it possible to prevent the first separator plate 100 and the second separator plate 200 from being rebonded to each other. Prevention of the first separator plate 100 and the second separator plate 200 from being rebonded to each other makes it possible to prevent the first separator plate 100 and the second separator plate 200 from being integrated into an undesirable posture.

FIGS. 6A, 6B, 6C, and 6D are similar in configuration and behavior to the exemplary embodiment described in FIGS. 5A, 5B, 5C, and 5D.

Figure 6A:
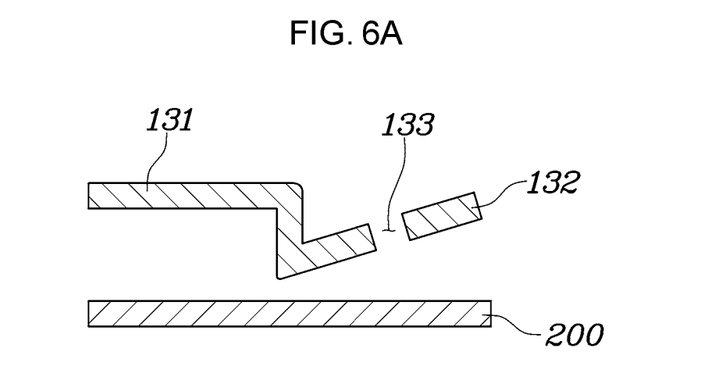
Figure 6B:
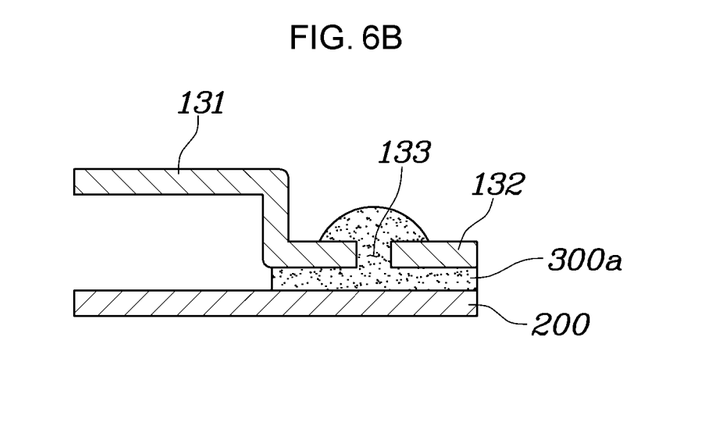

However, as shown in FIG. 6A, a through hole 133 is formed in a second portion 132 of a first separator plate 100, and as shown in FIG. 6B, the first separator plate 100 and a second separator plate 200 are bonded to each other by an adhesive 300a. In the instant case, the adhesive 300a applied to an interface between the second portion 132 of the first separator plate 100 and the second separator plate 200 is filled in the through hole 133 of the first separator plate 100 and is also applied to a surface of the second portion 132 the first separator plate 100, the surface being opposite to the interface, leading to an improvement of the adhesive force. This makes it possible to prevent the adhesive force between the first separator plate 100 and the second separator plate 200 from being deteriorated when the second portion 132 of the first separator plate 100 is elastically deformed.

In an exemplary embodiment of the present invention, the first portion 131 may include a first member 131a aligned in parallel to the second separator plate 200 and a second member 131b aligned perpendicular to the first member 131a to form a right angle or obtuse angle between the first member 131a and the second member 131b. In addition, the second member 131b is aligned to form an acute angle θ2 between the second member 131b and the second portion 132.

Figure 6C:
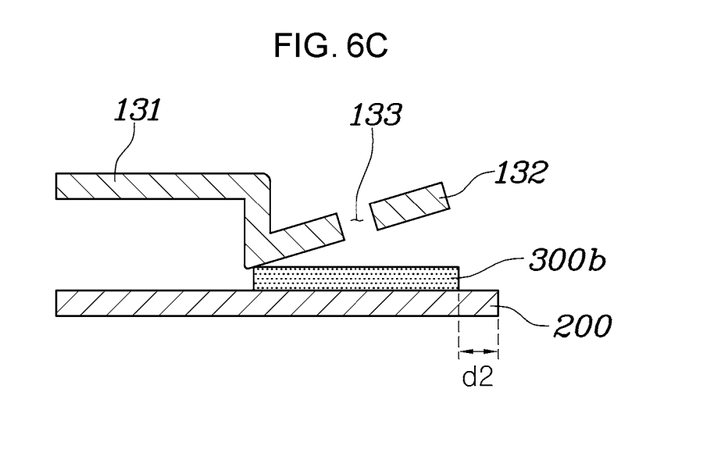

In the instant state, when the ambient temperature of the fuel cell stack is changed from room temperature to high temperature due to operation of the fuel cell stack, as shown in FIG. 6C, the adhesive 300a becomes an adhesive 300b which is in a state where the adhesive force is released due to operation temperature of the fuel cell stack. Thus, the adhesive force of the adhesive 300b being released causes the first and second separator plates 100 and 200 to be separated at the interface therebetween and causes the adhesive 300b filled in the through hole 133 to be separated. This causes the second portion 132 of the first separator plate 100 to be restored to a shape to be bent and gradually spaced out from the second separator plate 200 by an elastic force exerting thereon upon separation. Additionally, because the first and second separator plates 100 and 200 are separated at the interface therebetween due to the adhesive force of the adhesive 300b being released, the first separator plate 100 and the second separator plate 200 do not interfere with each other even upon expansion. This makes it possible to prevent a phenomenon where the first separator plate 100 and the second separator plate 200 undergo undesirable bending deformation.

Figure 6D:
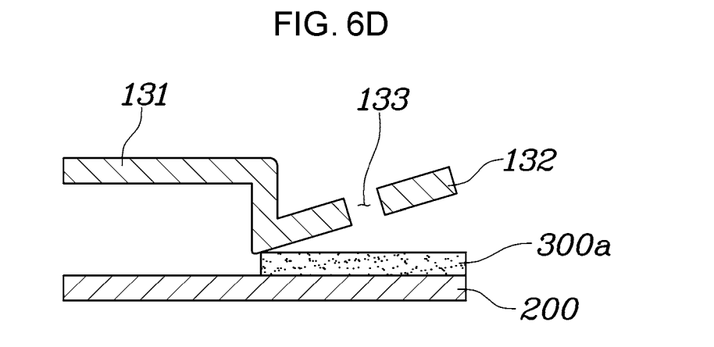

When operation of the fuel cell stack is terminated in the instant state, the ambient temperature of the fuel cell stack is changed from high temperature to room temperature, causing the first separator plate 100 and the second separator plate 200 to contract without interfering with each other as shown in FIG. 6D. Herein, the ambient temperature is lowered below a melting point of the adhesive 300a, causing the adhesive force exerted thereby to be generated again. However, the second portion 132 of the first separator plate 100 having been restored in shape by the adhesive force exerting thereon and the second separator plate 200 are maintained in a state of being spaced from each other, making it possible to prevent the first separator plate 100 and the second separator plate 200 from being rebonded to each other.

FIGS. 7A, 7B, 7C, and 7D are similar in configuration and behavior to the exemplary embodiment described in FIGS. 5A, 5B, 5C, and 5D.

Figure 7A:
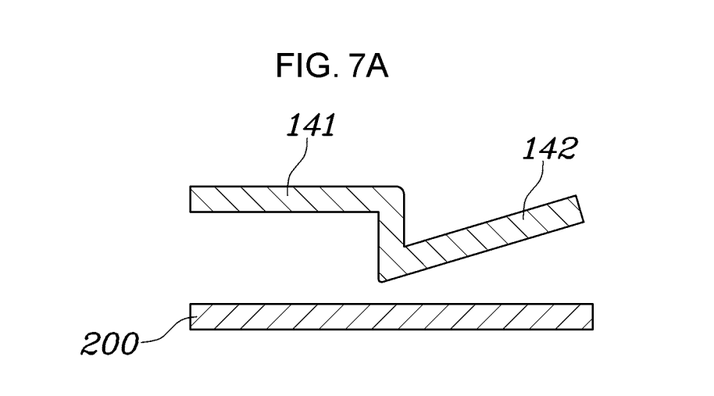

In an exemplary embodiment of the present invention, the first portion 141 may include a first member 141a aligned in parallel to the second separator plate 200 and a second member 141b aligned perpendicular to the first member 141a to form a right angle or obtuse angle between the first member 141a and the second member 141b. In addition, the second member 141b is aligned to form an acute angle θ2 between the second member 141b and the second portion 142.

Figure 7B:
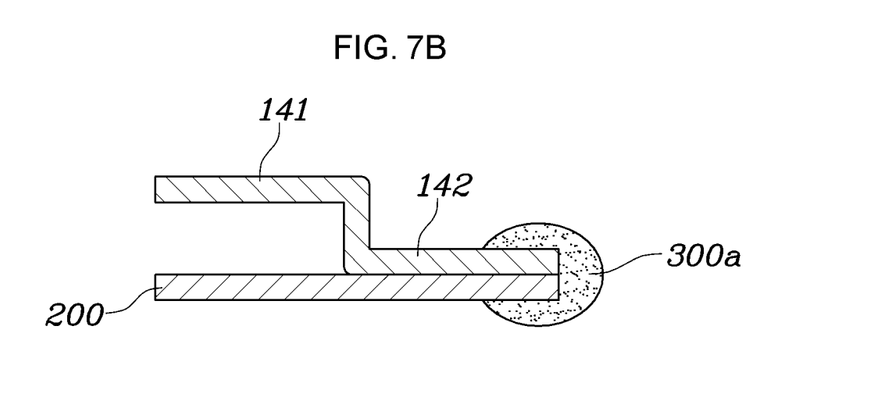

However, as shown in FIG. 7B, an adhesive 300a is applied to surround an end portion of a second portion 142 of a first separator plate 100 and an end portion of a second separator plate 200, causing the first separator plate 100 and the second separator the plate 200 to be integrated to each other.

Figure 7C:
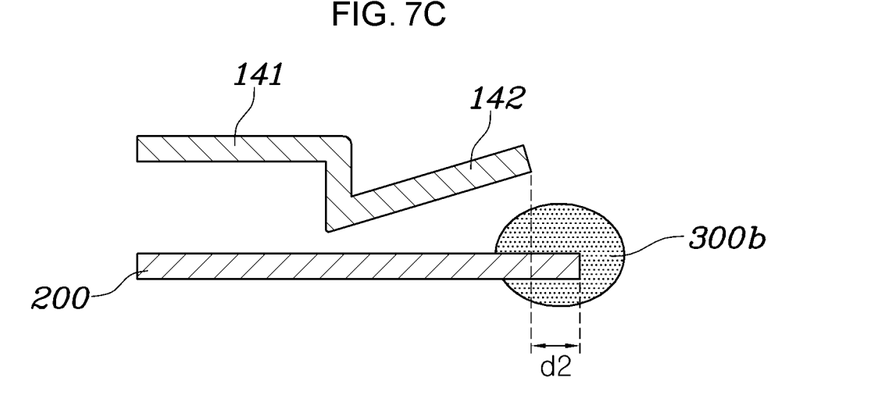

In the instant state, when the ambient temperature of the fuel cell stack is changed from room temperature to high temperature due to operation of the fuel cell stack, as shown in FIG. 7C, the adhesive 300a becomes an adhesive 300b which is in a state where an adhesive force is released due to operation temperature of the fuel cell stack, and thus the first and second separator plates 100 and 200 are separated at an interface therebetween due to the adhesive force of the adhesive 300b being released. This causes the second portion 142 of the first separator plate 100 to be restored to a shape to be bent and gradually spaced out from the second separator plate 200 by an elastic force exerting thereon upon separation. Additionally, because the first and second separator plates 100 and 200 are separated at the interface therebetween due to the adhesive force of the adhesive 300b being released, the first separator plate 100 and the second separator plate 200 do not interfere with each other even upon expansion. This makes it possible to prevent a phenomenon where the first separator plate 100 and the second separator plate 200 undergo undesirable bending deformation.

Figure 7D:
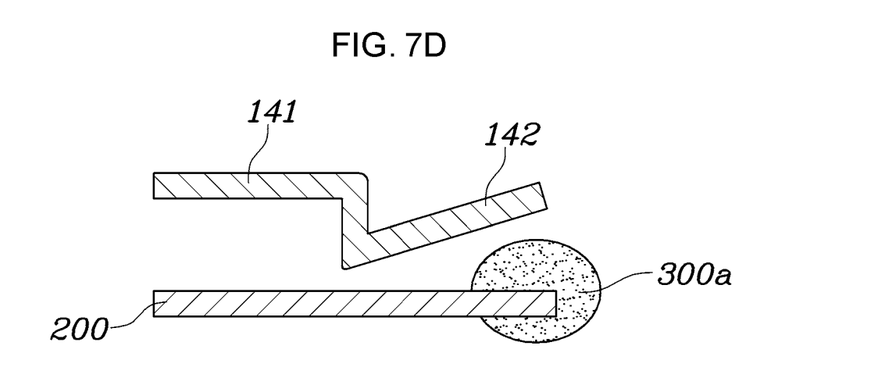

When operation of the fuel cell stack is terminated in the instant state, the ambient temperature of the fuel cell stack is changed from high temperature to room temperature, causing the first separator plate 100 and the second separator plate 200 to contract without interfering with each other as shown in FIG. 7D. Herein, the ambient temperature is lowered below a melting point of the adhesive 300a, causing the adhesive force exerted thereby to be generated again. However, the second portion 142 of the first separator plate 100 having been restored in shape by the adhesive force exerting thereon and the second separator plate 200 are maintained in a state of being spaced from each other, making it possible to prevent the first separator plate 100 and the second separator plate 200 from being rebonded to each other.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A fuel cell stack formed by stacking a plurality of cell units, the fuel cell stack comprising:
the plurality of cell units each including a first separator plate and a second separator plate mounted opposite to the first separator plate with a membrane electrode assembly interposed therebetween,
wherein the first and second separator plates of adjacent cell units are mounted to face each other and are bonded to each other by an adhesive, the adhesive having an adhesive property varying according to a temperature change such that an adhesive force of the adhesive is maintained at a temperature lower than an operating temperature of the fuel cell stack and is released at or above the operating temperature of the fuel cell stack, and
wherein the first separator plate and the second separator plate are made of metal materials having different thermal expansion coefficients.

2. The fuel cell stack of claim 1, wherein the thermal expansion coefficient of the first separator plate is smaller than the thermal expansion coefficient of the second separator plate.

3. The fuel cell stack of claim 1, wherein the adhesive is a thermoplastic adhesive.

4. The fuel cell stack of claim 2, wherein the adhesive is a cyanoacrylate-based adhesive.

5. The fuel cell stack of claim 1, wherein the adhesive is applied to an interface between the first and second separator plates at predetermined points on edge portions of the first and second separator plates.

6. The fuel cell stack of claim 1, wherein the adhesive is applied to surround end portions of the first and second separator plates at predetermined points on edge portions of the first and second separator plates.

7. The fuel cell stack of claim 1,
wherein an edge portion of the first separator plate includes:
a first portion spaced from the second separator plate; and
a second portion extending and bent from the first portion and being in contact with the second separator plate via the adhesive, and
wherein the first portion is formed in a central direction of the first separator plate, and the second portion is formed in an outward direction of the first separator plate.

8. The fuel cell stack of claim 7,
wherein the second portion of the first separator plate is formed to be inclined from the second separator plate and is bonded to the second separator plate by the adhesive in a state of being elastically bent and deformed.

9. The fuel cell stack of claim 7,
wherein the second portion of the first separator plate has a through hole formed therein, and
wherein the adhesive is filled in the through hole.

10. The fuel cell stack of claim 7,
wherein the first separator plate includes a material having a thermal expansion coefficient smaller than a thermal expansion coefficient of the second separator plate.

11. The fuel cell stack of claim 7,
wherein the first portion includes:
a first member aligned in parallel to the second separator plate; and
a second member aligned perpendicular to the first member to form a right angle between the first member and the second member, and
wherein the second member is aligned perpendicular to the second portion to form a right angle between the second member and the second portion.

12. The fuel cell stack of claim 7,
wherein the first portion includes:
a first member aligned in parallel to the second separator plate; and
a second member aligned perpendicular to the first member to form a right angle between the first member and the second member, and
wherein the second member is aligned to form an acute angle between the second member and the second portion.

13. The fuel cell stack of claim 12,
wherein the second portion of the first separator plate is bonded to the second separator plate by the adhesive in a state of being elastically bent and deformed.

14. The fuel cell stack of claim 13,
wherein the second portion of the first separator plate has a through hole formed therein, and
wherein the adhesive is filled in the through hole for the second portion of the first separator plate to be bonded to the second separator plate.

* * * * *